United States Patent [19]

Banda et al.

[11] Patent Number: 5,396,630
[45] Date of Patent: Mar. 7, 1995

[54] METHOD AND SYSTEM FOR OBJECT MANAGEMENT ACROSS PROCESS BOUNDRIES IN A DATA PROCESSING SYSTEM

[75] Inventors: Venu P. Banda; Robert F. Selby; Scott E. Snyder; Jeffrey T. Tuatini, all of Austin, Tex.

[73] Assignee: International Business Machines Corporation, Armonk, N.Y.

[21] Appl. No.: 957,339

[22] Filed: Oct. 6, 1992

[51] Int. Cl.$^6$ .............................................. G06F 9/44
[52] U.S. Cl. ........................... 395/700; 364/DIG. 1; 364/280; 364/281.3; 364/281.7; 395/650
[58] Field of Search ................................ 395/650, 700

[56] References Cited

U.S. PATENT DOCUMENTS

| | | | |
|---|---|---|---|
| 4,575,797 | 3/1986 | Gruner et al. | 364/200 |
| 4,862,356 | 8/1989 | Van Trigt | 364/300 |
| 4,885,717 | 12/1989 | Beck et al. | 364/900 |
| 4,937,760 | 6/1990 | Beitel et al. | 364/513 |
| 4,953,080 | 8/1990 | Dysart et al. | 364/200 |
| 4,989,132 | 1/1991 | Mellender et al. | 364/200 |
| 5,043,869 | 8/1991 | Suzuki et al. | 364/200 |
| 5,057,996 | 10/1991 | Cutler et al. | 364/200 |
| 5,058,185 | 10/1991 | Morris et al. | 382/41 |
| 5,075,845 | 12/1991 | Lai et al. | 395/425 |
| 5,079,695 | 1/1992 | Dysart et al. | 395/700 |
| 5,093,914 | 3/1992 | Coplien et al. | 395/700 |
| 5,095,522 | 3/1992 | Fujita et al. | 395/200 |
| 5,129,084 | 7/1992 | Kelly, Jr. et al. | 395/650 |
| 5,136,712 | 8/1992 | Perazzoli, Jr. et al. | 395/700 |
| 5,157,777 | 10/1992 | Lai et al. | 395/425 |
| 5,226,161 | 7/1993 | Khoyi et al. | 396/650 |
| 5,261,080 | 11/1993 | Khoyi et al. | 395/500 |
| 5,265,206 | 11/1993 | Shackelford et al. | 395/200 |
| 5,287,447 | 2/1994 | Miller et al. | 395/157 |
| 5,303,375 | 4/1994 | Collins et al. | 395/650 |
| 5,313,629 | 5/1994 | Abraham et al. | 395/600 |

FOREIGN PATENT DOCUMENTS

| | | | |
|---|---|---|---|
| 0474339A2 | 7/1991 | European Pat. Off. | G06F 9/44 |
| 0501610A2 | 1/2892 | European Pat. Off. | G06F 9/44 |

OTHER PUBLICATIONS

Paulo Guedes et al., Object-Oriented Interfaces in the Mach 3.0 Multi-Server System, IEEE, Feb. 1991, pp. 114–117.
Richard Rashid et al., Mach: A Foundation for Open Systems, IEEE, 1989, pp. 109–113.
"Modules, Objects and Distributed Programming:Issues in RPC and Remote Object Invocation" pp. 77–90.
"Implementing Location Independent Invocation" pp. 550–559.

(List continued on next page.)

*Primary Examiner*—Kevin A. Kriess
*Attorney, Agent, or Firm*—Mark E. McBurney; Duke W. Yee; Andrew J. Dillon

[57] ABSTRACT

The present invention provides a method and system in a data processing system, having a multitasking operating system which includes a plurality of processes, for providing communication between objects executing within the processes in the multitasking operating system, the method and system includes registering an object within a communications manager in response to a launching of the object. The communications manager monitors all objects registered with the communications manager within the plurality of processes. A determination of whether a first object is registered is made utilizing the communications manager, in response to receiving a request from a second object to send a message to the first object. Automatic initiation of the launching the first object within the processes is performed if the first object is unregistered utilizing the communications manager. Next, the first process containing the first object is bound to the second process containing the second object, wherein a communications path is established between the first process and the second of the process. The message is sent to the first object from the second object via the established communications path between the two processes, wherein communication between the first object and the second object is automatically established.

18 Claims, 6 Drawing Sheets

OTHER PUBLICATIONS

IBM Technical Disc. Bulletin vol. 34 No. 8, Jan. 1992, "Security Model For Office Objects" pp. 360-362.

IBM Technical Disc. Bulletin, vol. 34 No. 6, Nov. 1991, "Smalltalk/v Presentation Manager Officevision/2 Device Object Component" pp. 404-406.

IBM Technical Disc. Bulletin vol. 33 No. 6B, Nov. 1990, "Heterogeneous Object Model-View Relationships" pp. 242-243.

IBM Technical Disc. Bulletin vol. 32 No. 1, Jun. 1989, "Using The Attributes Of An Identified Object To Create A New Object Based On the Answer Set" (Save Data As Table) p. 139.

IBM Technical Disc. Bulletin vol. 18 No. 5, Oct. 1975, R. B. Bennett et al. "Object Creation Mechanism For An Object Management System" pp. 1361-1364.

IBM Technical Disc. Bulletin vol. 20 No. 3, Aug. 1977, E. B. Fernandez et al. "Data Grouping Scheme For Authorization Purposes" pp. 1215-1219.

IBM Technical Disc. Bulletin vol. 32 No. 10A, Mar. 1990, "Object Data Manager" pp. 55-57.

Research Disclosure No. 293, Sep. 1988 "Single Action to Both Create and Modify an Object".

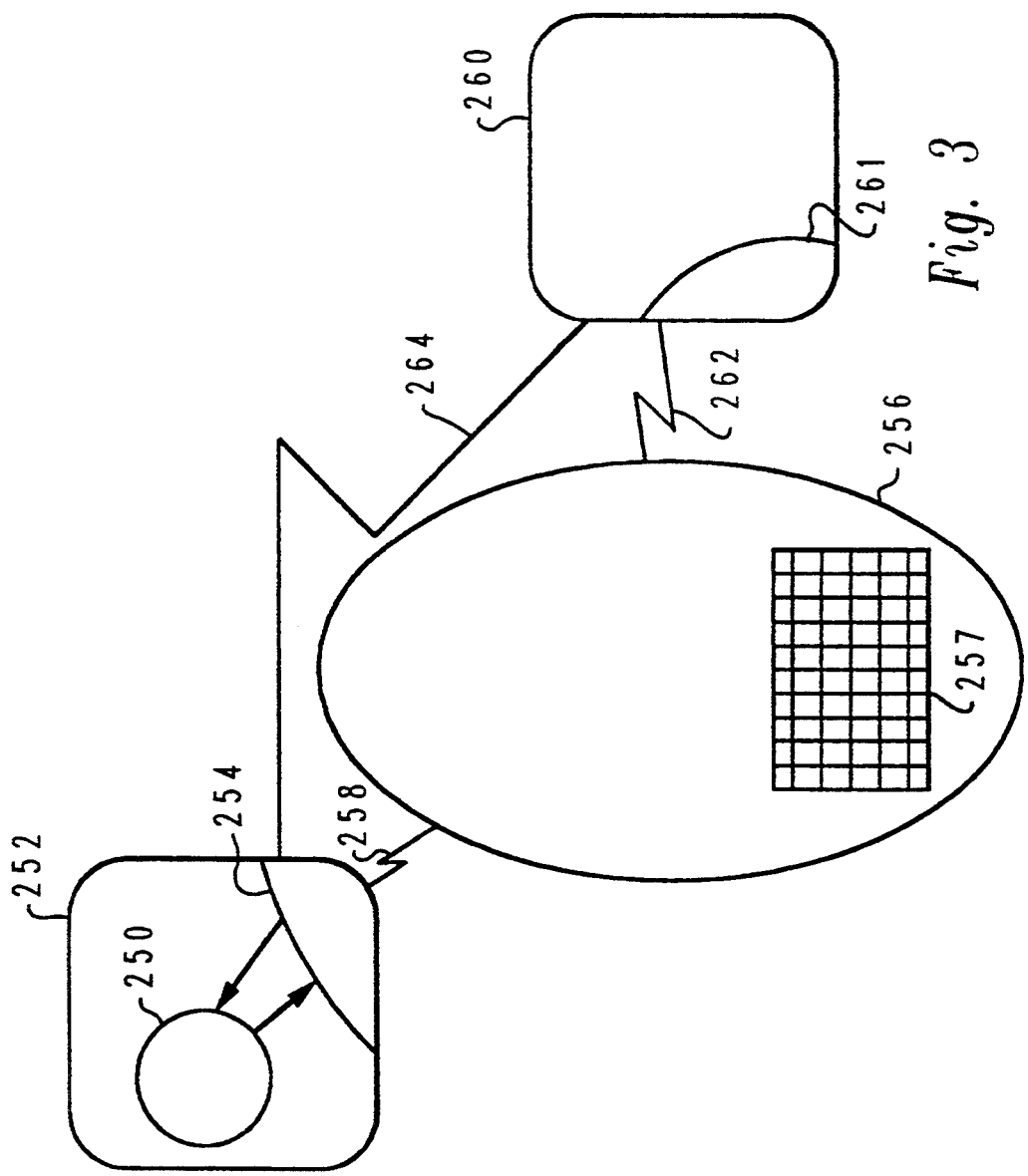

METHOD AND SYSTEM FOR OBJECT MANAGEMENT ACROSS PROCESS BOUNDRIES IN A DATA PROCESSING SYSTEM

BACKGROUND OF THE INVENTION

1. Technical Field

The present invention relates in general to a method and system for managing communications in a data processing system and in particular to a method and system for managing communications between objects executing in a data processing system. Still more particularly, the present invention relates to a method and system for managing communications between objects executing in different processes in a data processing system.

2. Description of the Related Art

In multi-tasking operating systems, hardware may be managed as a shared resource to be distributed among concurrently executing applications or programs. In a multi-tasking operating system, resources such as the processor, memory, files, devices and inter-process communications structures are also shared in the operating system among concurrently executing applications, programs, or objects. "Timeslicing" is utilized to share the processor with various concurrently executing applications or objects. Generally, an operating system will switch between applications allowing each application to run for a short period of time, a "timeslice". Thus, in this manner, the processor may be shared between various applications or objects, enabling multitasking.

For example, OS/2 is an operating system that offers a multitasking architecture, providing the capability to execute multiple programs in a protected environment. OS/2 is a registered trademark and a product of International Business Machines Corporation. OS/2 includes a hierarchy of multi-tasking objects called sessions, processes, and threads. A "session" is a unit of user input/output ("I/O") device sharing. A "process" is a unit for sharing for various resources, such as memory, files, semaphores, queues, and threads. A process may contain multiple programs or objects. More information on OS/2 can be found in a text entitled *The Design of OS/2* by Deitel and Kogan, published by Addison-Wesley Publishing Co. 1992.

Objects are DCE objects as defined in OSF DCE *User's Guide And Reference* from Open Software located at 11 Cambridge Center, Cambridge, Mass. 02143. In an environment containing different and potentially independent application objects (all of which are built upon a base class hierarchy), which are being developed, a need exists to decouple the run-time environments in which the objects execute. The need for decoupling arises out of a concern for integrity between the objects. Generally, if two objects are executing within the same process, the failure of one object will jeopardize the other object. In other words, if one object fails within a process, normally all of the other objects within the same process will also fail or become unstable. An erroneous implementation of one object also may corrupt the other objects.

Objects executing within the same process are able to easily exchange data. Often times, it is desirable to interchange data or send messages to an object within a different process. Data exchange becomes more difficult between objects executing in different processes.

Presently, data sharing and message sending between two objects, located in different processes, are handled by writing a protocol specific to the two objects. As a result, data sharing and message sending may only occur between those two objects. In order to add a third object, additional code must be produced to allow for data sharing and message sending between all three objects.

Therefore, it would be desirable to have a method and system to manage the distribution and communication of data and messages across processes without having to produce new protocols for each additional process.

SUMMARY OF THE INVENTION

It is therefore one object of the present invention to provide a method and system for managing communications in a data processing system.

It is another object of the present invention to provide a method and system for managing communications between objects executing within a data processing system.

It is yet another object of the present invention to provide a method and system for managing communications between objects executing in different processes within a data processing system.

The foregoing objects are achieved as is now described. The present invention provides a method and system in a data processing system, having a multitasking operating system that includes a plurality of processes, for providing communication between objects executing within the processes in the multitasking operating system. The method and system includes registering an object with a communications manager in response to a launching of the object. The communications manager monitors all objects registered to it within the plurality of processes. A determination of whether a first object is registered is made utilizing the communications manager, in response to receiving a request from a second object to send a message to the first object. Automatic initiation of the launching the first object within the processes is performed utilizing the communications manager if the first object is unregistered. Next, the process containing the first object is bound to the process containing the second object, wherein a communications path is established between the two processes. The message is sent to the first object from the second object via the communications path between the two processes, wherein communication between the first object and the second object is automatically established.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a data flow diagram illustrating the establishment of a communications link between two processes in a situation where one object has not been instantiated in accordance with a preferred embodiment of the present invention;

DETAILED DESCRIPTION OF PREFERRED EMBODIMENT

Figure 1:
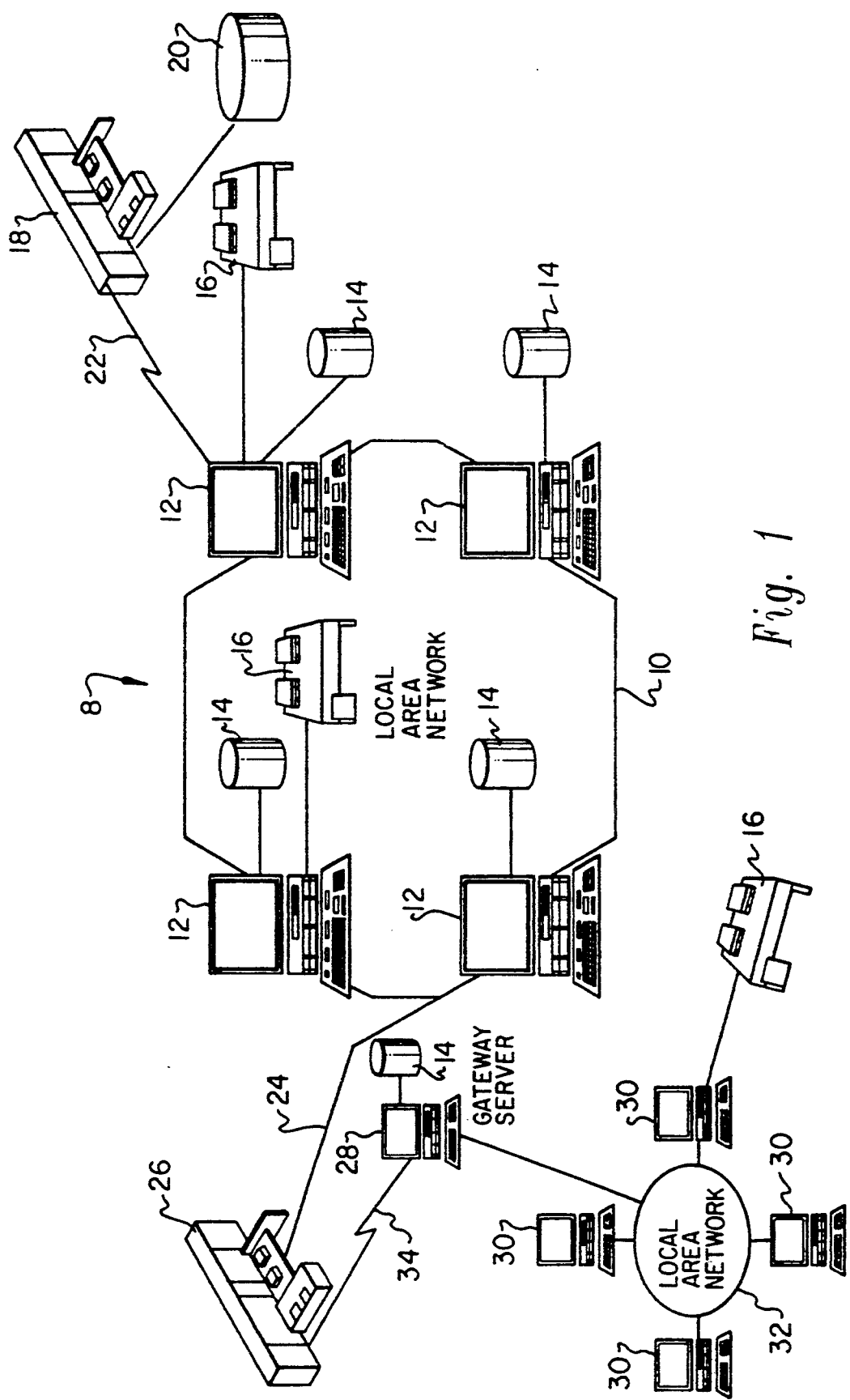
FIG. 1 depicts a pictorial representation of a data processing system which may be utilized to implement a method of the present invention.

With reference now to the figures, and in particular with reference to FIG. 1, there is depicted a pictorial representation of a data processing system 8 that may be utilized to implement a method and system of the present invention. As may be seen, data processing system 8 may include a plurality of networks, such as local area networks (LAN) 10 and 32, each of which preferably includes a plurality of individual computers 12 and 30, respectively. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing system 8 may also include multiple mainframe computers, such as mainframe computer 18, which may be preferably coupled to LAN 10 by means of communications link 22. Mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

A multitasking environment including multiple processes may be found on individual computers 12 and 30, on gateway server 28, on some computer in LAN 10 or 32, or on mainframe computer 18.

In accordance with a preferred embodiment of the present invention, a object management system is utilized to manage communications across processes and to track and locate objects executing within the processes in the multitasking environment. The object management system includes an object dispatcher process (ODP) and a message dispatcher (MD). This management system may include: (1) a launching mechanism to launch or initiate the launching of an object within a process, (2) a mechanism for grouping objects within a process, (3) a location mechanism to locate the process within which an object is executing, and (4) a system for forwarding messages.

An object is identified by a static identity and a dynamic identity. The "static identity" is the DCE name of the object, i.e., its spatial I identification, in accordance with a preferred embodiment of the present invention. For example, / . . . /austin.ibm.com/host/obj1 identifies "obj1" as an object in the "host" subdirectory of "austin.ibm.com" cell. Next, the "dynamic identity" of an object is defined by a process-ID and a pointer in accordance with a preferred embodiment of the present invention.

The object management system monitors the objects within the various processes and maintains a local registry of all active objects. An object requesting a communications path to a target object utilizes a static identity to identify the target object. An object locator component of the object management system in the ODP is utilized to identify the dynamic identity of an object that corresponds to the static identity of the object. A mapping table is employed in the ODP to track and monitor objects registered to the ODP. If an entry for the name of an object is absent from the mapping table, the ODP launches or initializes the launching of the object in accordance with a preferred embodiment of the present invention. The ODP registers an object when the ODP launches the object. Registration also occurs when an object communicates with the ODP.

Three pieces of information are required to launch an object in accordance with a preferred embodiment of the present invention: (1) object identity, (2) class of the object, and (3) object handler. With an object identity, the static identity is sufficient if the object is not yet active. The object handler includes the code corresponding to the methods of the object.

The ODP is a pivotal process in the method and system utilized to initiate and manage inter-object communication across processes and also may provide an "object locator" service in accordance with a preferred embodiment of the present invention. The ODP is a communications manager and constantly monitors for messages on a well-known port. Each communications path or channel to the ODP from a process is serviced by a "receiver thread", which is responsible for receiving a message on the appropriate path, decoding the message, and taking or initiating appropriate actions. A "receiver thread" is a thread within the ODP. Appropriate actions such as launching or initiating the launching of objects and creating communication paths or channels between processes are examples of actions taken by the receiver thread.

A message received by the ODP may include the following components: (1) object name, (2) class, (3)

operation, and (4) arguments. An operation may be, for example, to find and load an object, to create a new instance of an object, or may be any other operation that is defined in an object's object handler. The object name is the name of the object that is to receive a message. The class is the class of that object. ODP registers objects that it launches and objects that communicate with the ODP.

The MD may manage inter-process and intra-process communication between objects in accordance with a preferred embodiment of the present invention. It is responsible for delivering messages or methods to objects within the process in which the MD is located. Incoming messages from another process are handled by forwarding them to the appropriate object by utilizing the object handle field within the message.

When a local object sends a message to a foreign object, located in a different process and no communications path has been established between the two processes, the MD sends the message to the ODP to establish a communications path to the process containing the foreign object. The ODP searches the mapping table to determine if an entry for the foreign object exists.

In the event that an entry exists, the ODP extracts the dynamic identity (process-ID and handle within the process) of the foreign object from the mapping table. The handle within a process is utilized to identify an object within the process. The ODP sends the message to the foreign object and returns a message to the requesting process that contains the method name, argument list, and a handle within the process for the foreign object in accordance with a preferred embodiment of the present invention. The MD of the local object utilizes this information to send a message to the foreign object via a communications path or channel in accordance with a preferred embodiment of the present invention.

If the ODP does not find an object entry in the mapping table, the ODP searches a class table to determine whether or not the foreign object's class has been loaded into any process. If it has, a message is sent to that process to launch the foreign object. The message sent to the process may be in the format: (operation, argument list, class name, a DLL name). DLL stands for Dynamic Link Library. If the class of the foreign object has not been loaded into a process, a new process is started and the foreign object is launched within the new process.

In launching a object, it is assumed that the DCE name of the object is known as well as the class of the object and the name of the object handler for the object in accordance with a preferred embodiment of the present invention. The object handler of the object is the name of the dynamic link library (DLL) file in OS/2. A DLL is a set of subroutines that are dynamically bound to the calling program or object when the program or object is loaded into memory or when they are loaded explicitly by an already executing program or object. The DLL file contains the methods that the foreign object will respond to in accordance with a preferred embodiment of the present invention. More information on DLL calls may be found in La-Garde et al., *IBM Operating System/2 Version 1.2 Programming Guide*, International Business Machines Corporation, Document No. 00F8833, 1989 and in a text entitled *The Design of OS/2* by Deitel and Kogan, published by Addison-Wesley Publishing Co. 1992.

In the situation where a communications path has already been established between the process containing a local object and the process containing the foreign object, the invocation of an operation on a foreign object by a local object results in the MD constructing the necessary message and forwarding it directly to the process that is executing the foreign object over the a communications path that was previously set up. MD maintains two tables for managing inter-process and intra-process communications: (1) class table and (2) object table in accordance with a preferred embodiment of the present invention. The class table is a data structure that maintains a list of all classes that are registered in a particular process. The object table is a table for storing a list of all objects existing within a particular process and foreign objects that are an in communication with these objects. As a result, MD also provides a grouping mechanism to group objects within a process.

Foreign objects are associated with binding information and channel identification that is necessary for reaching a foreign object. Channel identification is data that uniquely identifies a communications channel between a sender and a receiver. For example if a "sockets" implementation is being utilized for communication, a port number would uniquely identify the communications channel and if "shared memory" is employed for communication, the name of the shared memory segment would uniquely identify the communications channel. The MD also continuously "pings" or monitors the ODP to see if the ODP is currently executing. If MD determines through a time out mechanism that ODP is no longer running, it initiates a "clean up" and terminates itself.

Figure 2:
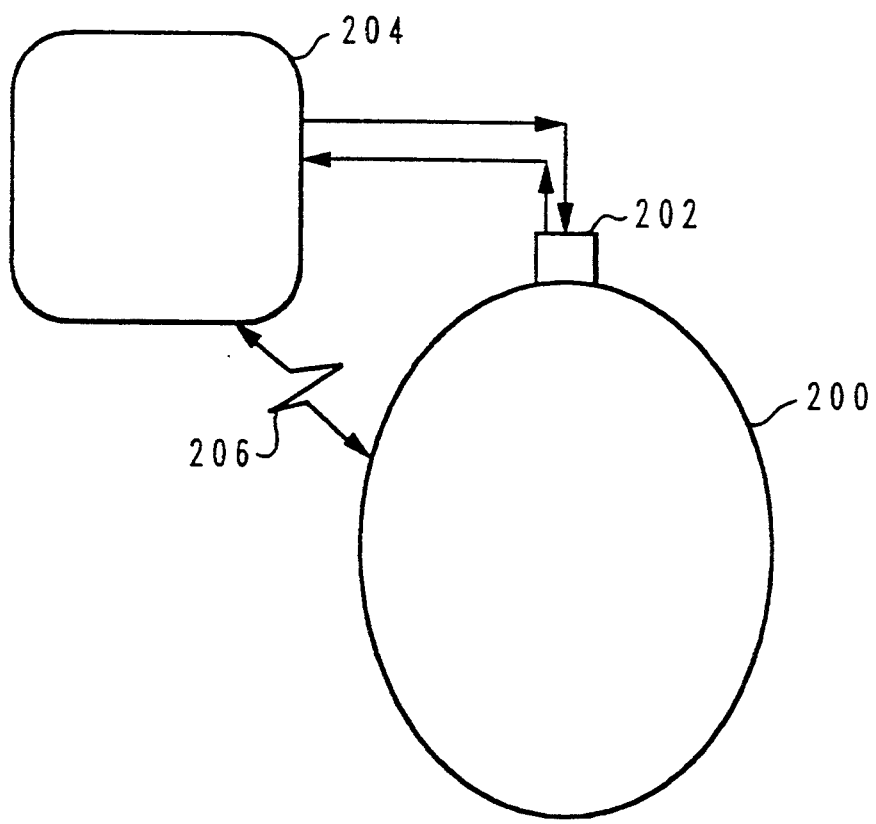
FIG. 2 is a diagram illustrating the establishment of a communications link between an object dispatch process (ODP) and a process in accordance with a preferred embodiment of the present invention.

Referring now to FIG. 2, there is depicted a diagram illustrating the establishment of a communications link between an ODP and a process in accordance with a preferred embodiment of the present invention. ODP 200 scans port 202 for requests from other processes or subsystems, such as process 204, to connect to ODP 200. A subsystem is a logical sub-component of a larger system, e.g., a file system in a operating system. Port 202 is a well known port known to those skilled in the art. Port 202 is a well known port that may be associated with a well known server process (i.e., name server, file-transfer protocol server, etc.). "Well known" ports are those that are active on all machines. In a network of computers, a process on a machine may be identified by a pair: (machine-ID, port number). The port number identifies a process on a given machine.

In response to such a request, ODP 200 returns a "binding" to the requesting process, process 204. The new binding represents a new communications path or channel, channel 206, between the process 204 and ODP 200. ODP 200 utilizes this channel in all subsequent interaction with process 204.

As mentioned before, each of the communications paths or channels associated with the ODP are serviced by a "receiver" thread. This thread is responsible for receiving the message on the appropriate path or channel, decoding the message, and taking or initiating the appropriate action. Messages received by ODP include object name, class, operation, and arguments.

With reference now to FIG. 3, there is depicted a data flow diagram illustrating the establishment of a communications link between two processes in a situation where one object has not been instantiated in accordance with a preferred embodiment of the present invention. Object 250 of class A is executing in process 252. Object 250 attempts to instantiate a new object, Obj2, of class B. MD 254 searches it's local class table and does not find class B.

Consequently, MD 254 sends a message to ODP 256 via communications path 258, asking ODP 256 to instantiate Obj2 of class B. Communications path 258 may be established as previously illustrated in FIG. 2. ODP 256 decodes the message and looks in its mapping table 257 for Obj2. Assuming ODP 256 does not find Obj2 in mapping table 257, ODP 256 then obtains the name of Obj2's class from the message.

ODP 256 initiates process 260 with class B loaded in it. MD 261 in process 260 instantiates or launches Obj2 and returns Obj2_Handle and a new binding to ODP 256 to form communications path 262. ODP 256 updates mapping table 257 to include the association between Obj2 and Obj2_Handle.

ODP 256 returns a binding to MD 254 to establish communications path 264. The MD 254 updates its local object table to associate Obj2 with the communications path to process 260 and returns a local handle for Obj2 to Object 250, forming communications path 264. All subsequent operations on Obj2 by objects in process 252 are sent directly to process 260 over communications path 264.

Figure 4A:
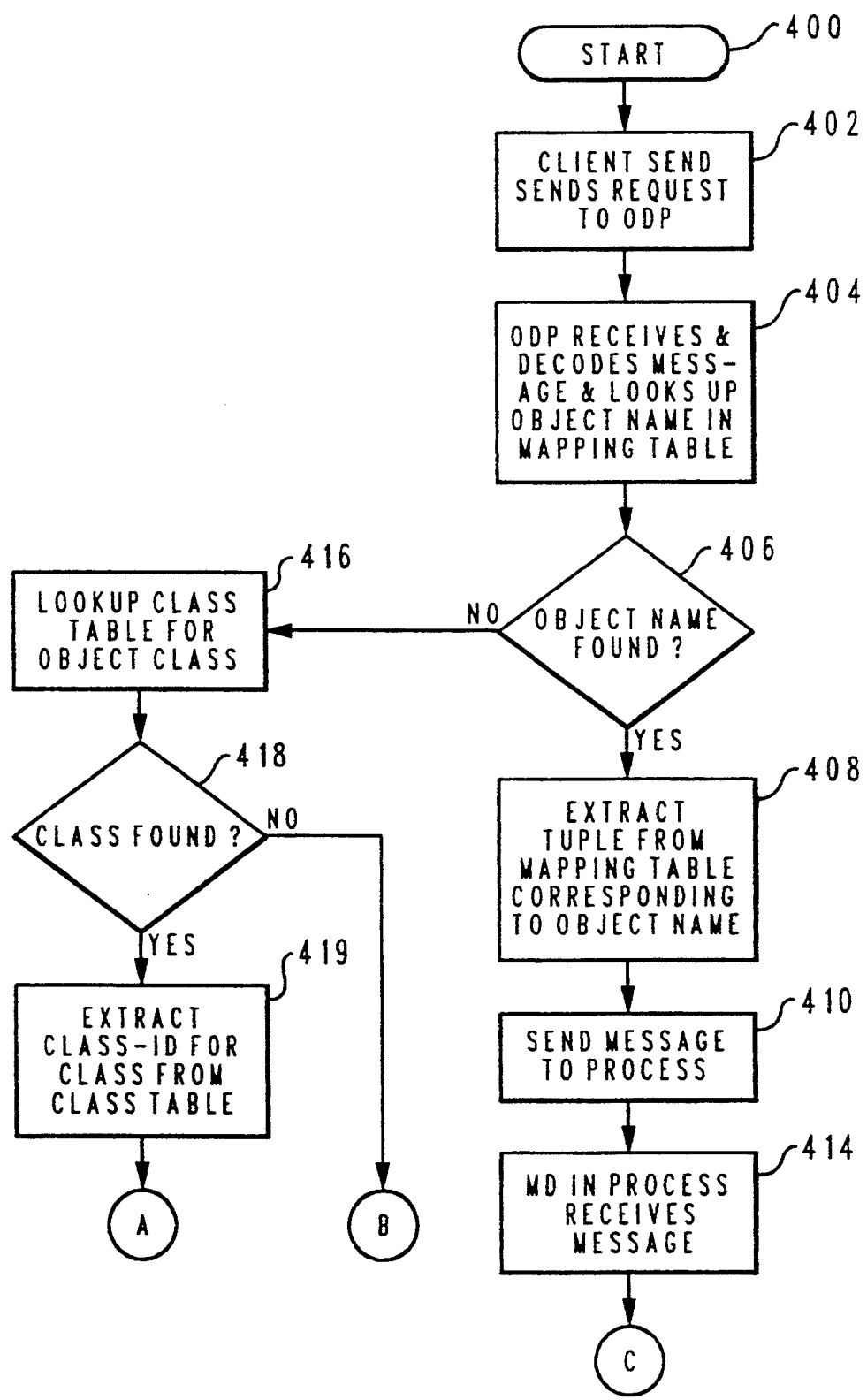
FIG. 4A is a portion of logical flowchart for creating a communications path in accordance with a preferred embodiment of the present invention.
Figure 4B:
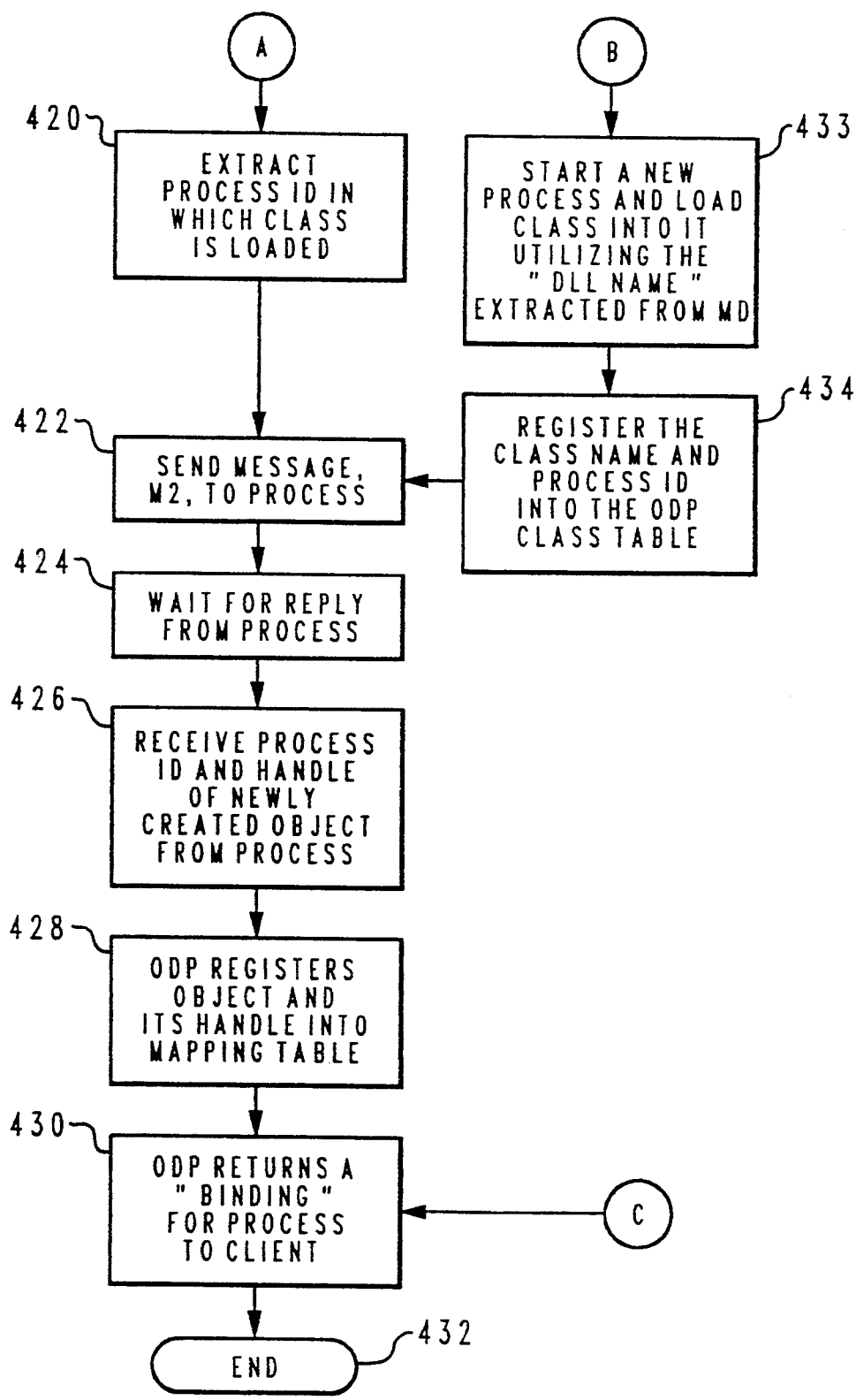
FIG. 4B is a portion of logical flowchart for creating a communications path in accordance with a preferred embodiment of the present invention.

Referring now to FIG. 4A and FIG. 4B, there is depicted a logical flowchart for creating a communications path in accordance with a preferred embodiment of the present invention. The procedure begins as illustrated in block 400 and thereafter proceeds to block 402, which depicts the sending of a request, MO, to the ODP by a requesting object, which is the client of the ODP, to create a communications path to a target object. M0 is a message, containing the following information on the target object: (1) object name, (2) object class, (3) method name, (4) an argument list, and (5) a DLL file name. "MO" identifies the object utilizing a static identity. The procedure then proceeds to block 404, which illustrates the reception of the message, M0, by the ODP, the decoding of the message, M0, and the looking up of the object name in a mapping table by ODP.

Next, the procedure then proceeds to block 406, which depicts a determination of whether or not an object name has been found in the ODP's mapping table corresponding to the object name specified in M0. The mapping table contains an entry for each object that is registered with the ODP. In accordance with a preferred embodiment of the present invention, each entry contains: (1) object name, (2) process-ID, and (3) handle within the process in which the object is found. As mentioned before, objects are registered when they send a request to the ODP or when the ODP launches an object. If an object name has been found, the procedure then proceeds to block 408, which illustrates the extraction of a tuple (process-ID, handle within process) from the mapping table and corresponding the tuple to the object name in M0.

Afterward, the procedure proceeds to block 410, which depicts the sending of a message, M1, to the MD in the process containing the target object. The message, M1, contains the method name, an arguments list, and the handle within the process. M1 contains the dynamic identity of the object. The procedure then proceeds to block 414, which illustrates the MD in the process of the target object receiving the message. The message includes the method name, an argument list, and the handle within the process for the object requested by the requesting object. Thereafter, the procedure proceeds to block 430 via connector C, which illustrates the return of a binding by the ODP to the client for the process containing the target object. Binding information is found within a connection table in the ODP. The connection table includes a process-ID associated with binding information for a particular process. This connection table is utilized to provide binding information to various objects requiring communications paths to objects in other processes in accordance with a preferred embodiment of the present invention. The process thereafter terminates as illustrated in block 432.

Referring back to block 406, if an object name is not found in the mapping table, the procedure proceeds to block 416, which illustrates the searching of a class table for the object class of the target object requested. The procedure then proceeds to block 418, which depicts a determination of whether or not the class is found in the class table in the ODP. The class table contains information on the object class and the process-ID associated with each object class in accordance with a preferred embodiment of the present invention. A class is registered when an object contacts the ODP if the class is not already in the class table. A class is also registered if the ODP launches or initiates the launching of a new process having a class not found in the ODP's class table. If the class is found, the procedure proceeds to block 419, which illustrates the extraction of a class-ID for the target object's class from the class table. Thereafter, the procedure continues to block 420 in FIG. 4B via connecter A. Block 420 illustrates the extraction of the process-ID in which the class of the target object is loaded. Thereafter, the procedure proceeds to block 422, which depicts the sending of a message, M2, to the process in which the class of the target object is loaded. The message, M2, contains (1) the object class, (2) opn-=new, and (3) the DLL of the target object. M2 is a request to launch the target object in the process. Next, the procedure proceeds to block 424, which illustrates waiting for a reply from the process in which the class of the target object is loaded.

Thereafter, the procedure proceeds to block 426, which depicts the reception of the process-ID and the handle of the newly created target object from the process in which the class is loaded. The procedure then proceeds to block 428, which illustrates the registration of the target object and its handle into the mapping table by the ODP. The procedure proceeds to block 430, which depicts the ODP returning a "binding" to the requesting object. As a result, future requests for the target object by the requesting object may be directly sent to the process containing the target object, and thus, bypassing the ODP and thereby increasing performance and speed of communications between objects. The procedure then terminates as illustrated in block 432.

Referring back to block 418, if a class is not found in the class table, the procedure then proceeds, via connector B, to block 433, which illustrates the initiation or launching of a new process and the loading of the class of the target object into the new process utilizing the class name extracted from the request from the requesting object. The procedure advances to block 434, which depicts the registration of the class name and the process-ID of the new process into the class table in the ODP.

Thereafter, the procedure proceeds to block 422, which depicts the sending of a message, M2, to the new process. As described above, M2 contains the target object class, opn="new", and the DLL of the target object. The procedure next advances to block 424, which illustrates waiting for a reply from the process. Afterward, the procedure continues to block 426, which depicts the returning of the process-ID and the handle of the newly created target object by the process to the ODP. The procedure then proceeds to block 428, which illustrates the registration of the target object and its handle into the mapping table by the ODP. The procedure next proceeds to block 430, which depicts the return of a "binding" for the process to the requesting object by the ODP. Again, the procedure then terminates as depicted in block 432.

Figure 5:
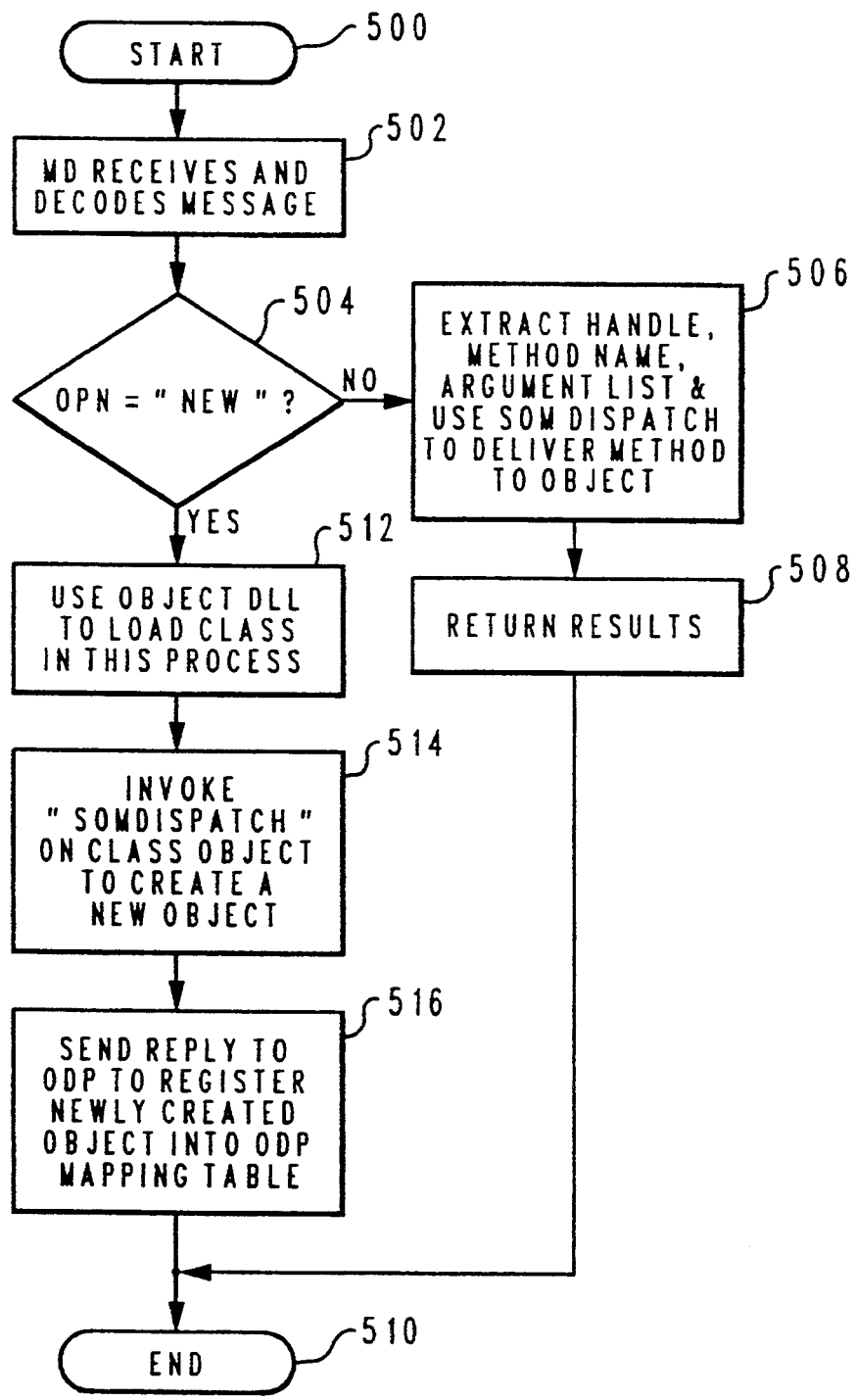
FIG. 5 depicts a logical flowchart of the process followed by a message dispatcher (MD) in accordance with a preferred embodiment of the present invention.

Referring now to FIG. 5, there is depicted a logical flowchart of the process followed by a message dispatcher (MD) in accordance with a preferred embodiment of the present invention. As illustrated the procedure begins in block 500 and thereafter proceeds to block 502, which depicts the reception of a message and the decoding of the message by the MD. Thereafter, the procedure proceeds to block 504, which illustrates a determination of whether or not opn equals "new". If opn does not equal "new" the procedure advances to block 506, which depicts the extraction of the handle, method name, and argument list from the message and utilizing a system object model (SOM) dispatch to deliver the message to the object. SOM is a mechanism utilized to deliver messages to objects within the same process. SOM is found in the OS/2 2.0 Software Development Toolkit (SDK) available from International Business Machines Corporation.

Thereafter, the procedure proceeds to block 508, which illustrates the returning of the results to the object sending the message. The procedure then terminates as depicted in block 510.

Referring again to block 504, if "opn" equals "new", the procedure then proceeds to block 512, which illustrates using the object DLL to load the class into the process. Thereafter, the procedure proceeds to block 514, which depicts the invocation of SOM dispatch on the above "class object" to create a new object. The procedure proceeds to block 516, which illustrates the sending of a reply to ODP to register the newly created object into ODP's mapping table. The procedure again terminates as illustrated in block 510.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system, having a multitasking operating system which includes a plurality of processes, for providing communication between a plurality of objects executing within said plurality of processes in said multitasking operating system, said method comprising the computer implemented steps of:

registering an object with a communications manager in response to a launching of said object by said object manager;

determining whether a first object is registered with said communications manager, in response to receiving a request from a second object within said plurality of processes to send a message to said first object;

automatically initiating launching of said first object within said plurality of processes utilizing said communications manager if said first object is unregistered;

binding a first of said plurality of processes containing said first object to a second of said plurality of processes containing said second object, wherein a communications path is established between said first of said plurality of processes and said second of said plurality of processes; and sending said message to said first object within said first of said plurality of processes from said second object in said second of said plurality of processes via said established communications path between said first of said plurality of processes and said second of plurality of processes, wherein communication between said first object and said second object is automatically established.

2. The method of claim 1 further comprising registering an object in response to a request for communication with said communications manager by said object.

3. The method of claim 2, wherein said communications manager registers an object by storing data for an object within a mapping table, wherein said mapping table contains an entry for each object registered by said communications manager.

4. The method of claim 3, wherein said entry includes an identifier identifying the process in which said registered object has been launched.

5. The method of claim 4, wherein said entry further includes a pointer to said object.

6. The method of claim 5, wherein said binding of said first of said plurality of processes to said second of said plurality of processes includes sending said second of said plurality of processes binding data for said first of said plurality of processes.

7. The method of claim 6, wherein each of said plurality of processes includes a message dispatcher for managing communications within a process and between processes, wherein said message dispatcher has a communications path to said communications manager.

8. The method of claim 7, wherein said message dispatcher for a process maintains a data structure having a list of all objects within said process and all objects in other processes having a communications path to said process.

9. A method in a data processing system, having a multitasking operating system which includes a plurality of processes, for providing communication between a plurality of objects executing within said plurality of processes in said multitasking operating system, said method comprising the computer implemented steps of:

registering an object with a communications manager in response to a launching of said object by said object manager, wherein said communications manager monitors all objects registered to said communications manager within said plurality of processes;

determining whether a first object is registered with said object manager in response to receiving a request from a second object within said plurality of processes to send a message to said first object;

automatically searching said plurality of processes for a process containing a class for said first object within said plurality of processes if said first object is unregistered and if a process containing said class is present, automatically initiating launching of said first object within said process containing said class for said first object;

binding said process containing said class for said first object to a second of said plurality of processes containing said second object, wherein a communications path is established between said process containing said class and said second of said plurality of processes; and sending said message to said first object within said process containing said class and said second object within said second of said plurality of processes via said established communications path between said process containing class and said second of plurality of processes, wherein communication between said first object and said second object is automatically established.

10. A data processing system, having a multitasking operating system which includes a plurality of processes, for providing communication between a plurality of objects executing within said plurality of processes in said multitasking operating system, said data processing system comprises:

registration means for registering an object with a communications manager in response to a launching of said object by said object manager;

determining means for determining whether a first object is registered with said communications manager in response to receiving a request from a second object within said plurality of processes to send a message to said first object;

initiation means for automatically initiating launching of said first object within said plurality of processes utilizing said communications manager if said first object is unregistered;

binding means for binding a first of said plurality of processes containing said first object to a second of said plurality of processes containing said second object, wherein a communications path is established between said first of said plurality of processes and said second of said plurality of processes; and sending means for sending said message to said first object within said first of said plurality of processes from said second object in said second of said plurality of processes via said established communications path between said first of plurality of processes and said second of plurality of processes, wherein communication between said first object and said second object is automatically established.

11. The data processing system of claim 10 further comprising means for registering an object in response to a request for communication with said communications manager by said object.

12. The data processing system of claim 11, wherein said communications manager registers an object utilizing means for storing data for an object within a mapping table, wherein said mapping table contains an entry for each object registered by said communications manager.

13. The data processing system of claim 12, wherein said entry includes an identifier identifying the process in which said registered object has been launched.

14. The data processing system of claim 13, wherein said entry further includes a pointer to said object.

15. The data processing system of claim 14, wherein said binding means includes means for sending said second of said plurality of processes binding data for said first of said plurality of processes.

16. The data processing system of claim 15, wherein each of said plurality of processes includes a message dispatcher for managing communications within a process and between processes, wherein said message dispatcher has a communications path to said communications manager.

17. The data processing system of claim 16, wherein said message dispatcher includes means for maintaining a data structure having a list of all objects within a process and all objects in other processes having a communications path to said process.

18. A data processing system, having a multitasking operating system which includes a plurality of processes, for providing communication between a plurality of objects executing within said plurality of processes in said multitasking operating system, said method comprising the computer implemented steps of:

means for registering an object with a communications manager in response to a launching of said object by said communications manager, wherein said object manager monitors all objects registered to said communications manager within said plurality of processes;

means for determining whether a first object is registered with said communications manager in response to receiving a request from a second object within said plurality of processes to send a message to said first object;

means for automatically searching said plurality of processes for a process containing said class for said first object within said plurality of processes if said first object is unregistered and if a process containing said class is present, means for automatically initiating launching of said first object within said process containing said class for said first object;

means for binding said process containing said class for said first object to a second of said plurality of processes containing said second object, wherein a communications path is established between said process containing said class and said second of said plurality of processes; and means for sending said message to said first object within said process containing class and said second object within said second of said plurality of processes via said established communications path between said process containing class and said second of plurality of processes, wherein communication between said first object and said second object is automatically established.

* * * * *